(12) United States Patent
Pan

(10) Patent No.: US 9,232,039 B2
(45) Date of Patent: Jan. 5, 2016

(54) AUDIO PLAYBACK SYSTEM

(71) Applicant: Primax Electronics Ltd., Neihu, Taipei (TW)

(72) Inventor: Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 143 days.

(21) Appl. No.: 14/107,404

(22) Filed: Dec. 16, 2013

(65) Prior Publication Data

US 2015/0023532 A1 Jan. 22, 2015

(30) Foreign Application Priority Data

Jul. 19, 2013 (TW) .............................. 102125938 A

(51) Int. Cl.
*H04R 5/02* (2006.01)
*H04M 1/725* (2006.01)
*G08C 23/04* (2006.01)
(52) U.S. Cl.
CPC ........... *H04M 1/72533* (2013.01); *G08C 23/04* (2013.01); *G08C 2201/93* (2013.01); *H04R 2430/01* (2013.01)

(58) Field of Classification Search
CPC ............. H04R 5/02; H04R 5/033; H04S 3/00
USPC .................................................. 381/300, 311
See application file for complete search history.

(56) References Cited

U.S. PATENT DOCUMENTS

| | | | |
|---|---|---|---|
| 4,745,402 A * | 5/1988 | Auerbach | 345/158 |
| 6,445,369 B1 * | 9/2002 | Yang et al. | 345/82 |
| 2012/0310703 A1 * | 12/2012 | Cavalcanti | G06Q 30/0201 705/7.29 |

* cited by examiner

*Primary Examiner* — Simon King
(74) *Attorney, Agent, or Firm* — Kirton McConkie; Evan R. Witt

(57) ABSTRACT

An audio playback system includes a handheld device and a digital stereo set. By the handheld device, a control message is converted into a pulse signal. Moreover, the on/off states of a visible light emitting element are controlled according to first pulse signal, so that a visible light signal is generated. After the visible light signal is received by an optical sensor of the digital stereo set, the visible light signal is restored to the control message. After the control message is received by the digital stereo set, the digital stereo set performs a corresponding control action.

25 Claims, 11 Drawing Sheets

| Binary code | Color light |
|---|---|
| 0 0 1 | Blue |
| 0 1 0 | Green |
| 1 0 0 | Red |
| 0 1 1 | Cyan |
| 1 1 0 | Yellow |
| 1 0 1 | Magenta |
| 1 1 1 | White |

FIG.6

| V | d2 | d1 | d0 | Voltage level signal |
|---|---|---|---|---|
| V7 | 1 | 1 | 1 | ⎍ |
| V6 | 1 | 1 | 0 | ⎍ |
| V5 | 1 | 0 | 1 | ⎍ |
| V4 | 1 | 0 | 0 | ⎍ |
| V3 | 0 | 1 | 1 | ⎍ |
| V2 | 0 | 1 | 0 | ⎍ |
| V1 | 0 | 0 | 1 | ⎍ |
| V0 | 0 | 0 | 0 | — |

AUDIO PLAYBACK SYSTEM

FIELD OF THE INVENTION

The present invention relates to an audio playback system, and more particularly to an audio playback system including a handheld device and a digital stereo set.

BACKGROUND OF THE INVENTION

Conventionally, a digital stereo set is controlled by using a control panel or a remote controller. As known, since the control panel or the remote controller can only provide basic control items, the control panel or the remote controller is not personalized. With increasing development of science and technology, the functions of the current handheld devices such as smart phones or tablet personal computers are very complete. Moreover, the current handheld devices have diversified controllable items and can perform personalized control actions. Consequently, it is an important issue to research how to use the handheld device to control the digital stereo set.

Nowadays, the handheld device may be in communication with the digital stereo set by a wireless communication technology in order to control the digital stereo set. The wireless communication technology widely used in the handheld device is for example a Wi-Fi communication technology, a Bluetooth communication technology or a near field communication technology. Regardless of which wireless communication technology is adopted, both of the handheld device and the digital stereo set should be additionally equipped with corresponding chips. In other words, the use of the wireless communication technology is neither cost-effective nor user-friendly. For example, during a Bluetooth pairing process, it is necessary to input the same password into the two devices. Moreover, since the above-mentioned wireless communication technologies belong to radio frequency communication technologies, the generated electromagnetic radiation is detrimental to the human bodies, and a problem of electromagnetic radiation channel occupancy occurs.

Therefore, there is a need of providing an improved communication and control method for a handheld device and a digital stereo set in order to eliminate the above drawbacks of the wireless communication and provide abundant personalized control actions.

SUMMARY OF THE INVENTION

The present invention relates to an audio playback system by using a handheld device to transmit a visible light to a digital stereo set.

In accordance with an aspect of the present invention, there is provided an audio playback system. The audio playback system includes a handheld device and a digital stereo set. The handheld device includes a first transmitting terminal controller. The first transmitting terminal controller includes a first visible light emitting element and a first optical signal generator. The first optical signal generator is used for converting a control message into a first pulse signal, and controlling on/off states of the first visible light emitting element according to the first pulse signal, thereby generating a first visible light signal. The digital stereo set includes a host and a sound box for playing a digital audio file. The digital stereo set further includes a first receiving terminal controller. The first receiving terminal controller includes a first optical sensor and a first optical signal reader. The first optical sensor is used for sensing the on/off states of the first visible light emitting element, thereby receiving the first visible light signal. The first optical signal reader is used for restoring the first visible light signal to the control message. After the control message is received by the digital stereo set, the digital stereo set performs a corresponding control action according to the control message.

In accordance with another aspect of the present invention, there is provided an audio playback system. The audio playback system includes a handheld device and a digital stereo set. The handheld device includes a first transmitting terminal controller. The first transmitting terminal controller includes a first visible light emitting element and a first optical signal generator. The first optical signal generator is used for converting a control message into at least one color light, and controlling the first visible light emitting element to emit the at least one color light, thereby generating a first visible light signal. The digital stereo set includes a host and a sound box for playing a digital audio file. The digital stereo set further includes a first receiving terminal controller. The first receiving terminal controller includes a first optical sensor and a first optical signal reader. The first optical sensor is used for sensing the at least one color light, thereby receiving the first visible light signal. The first optical signal reader is used for restoring the first visible light signal to the control message. After the control message is received by the digital stereo set, the digital stereo set performs a corresponding control action according to the control message.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 6 schematically illustrates an encoding rule for the audio playback system according to the second embodiment of the present invention;

DETAILED DESCRIPTION OF THE PREFERRED EMBODIMENT

Figure 1:
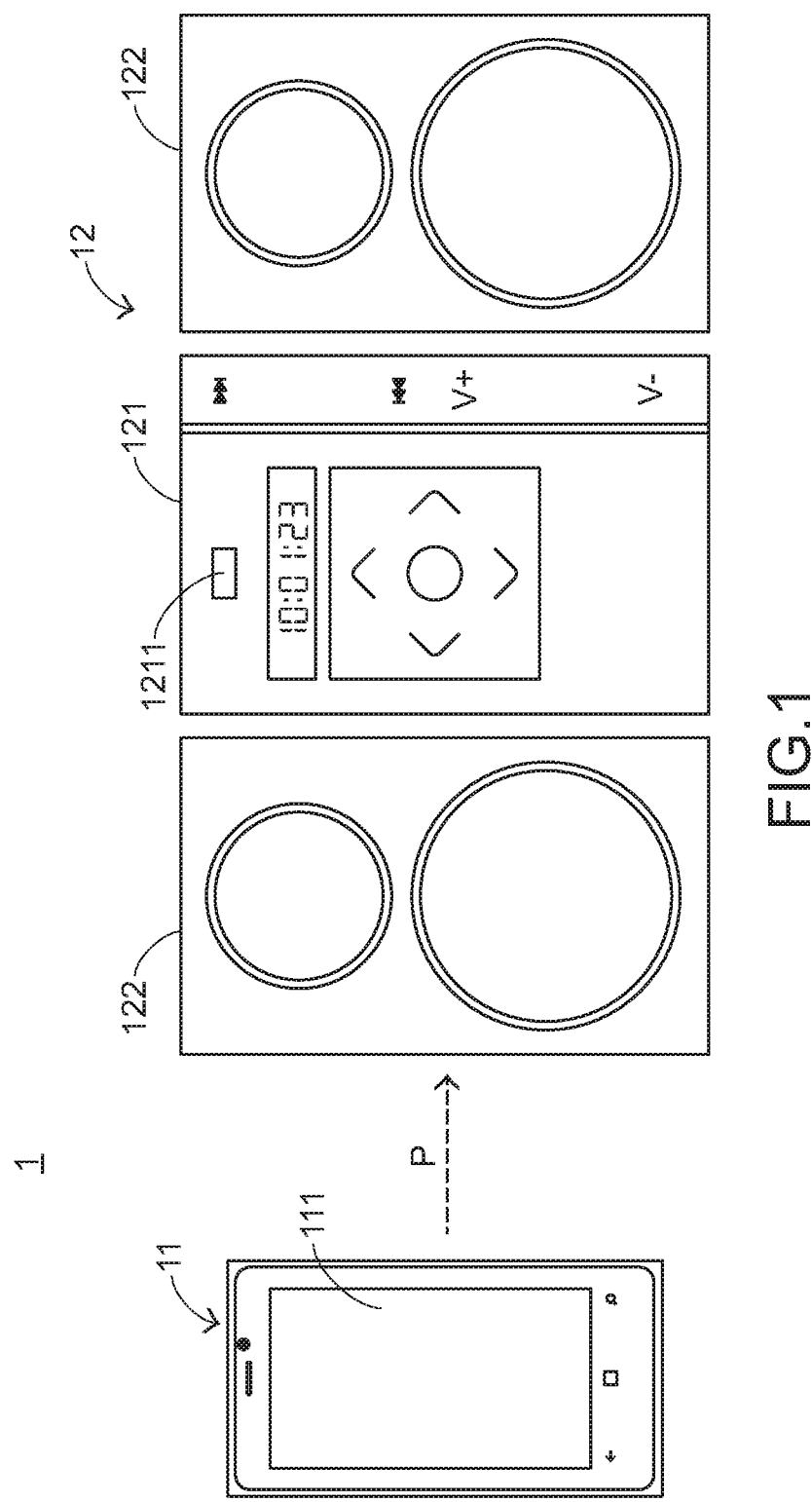
FIG. 1 schematically illustrates the architecture of an audio playback system according to a first embodiment of the present invention.

The present invention provides an audio playback system for eliminating the drawbacks of the prior art technology. First of all, the architecture of the audio playback system of the present invention will be illustrated as follows. FIG. 1 schematically illustrates the architecture of an audio playback system according to a first embodiment of the present invention. As shown in FIG. 1, the audio playback system 1 comprises a handheld device 11 and a digital stereo set 12.

In this embodiment, the handheld device 11 is a smart phone or a tablet personal computer. The smart phone or the tablet personal computer runs an operating system. An example of the operating system includes but is not limited to Android, iOS, BlackBerry OS, Windows Mobile, Windows Phone, bada OS or Symbian OS. It is noted that the handheld device 11 may be a smart phone or a tablet personal computer running any other appropriate operating system.

The digital stereo set 12 has the capability of playing digital audio files. The digital audio data denote the digitalized audio contents. For example, the digital audio files are WMA (Windows Media Audio) files, MP3 (MPEG Audio Layer 3) files, WAV (Waveform audio format) files or AAC (Advanced audio coding) files, but are not limited thereto. The digital stereo set 12 can also play other-format digital audio files.

The handheld device 11 comprises a first visible light emitting element 111. In this embodiment, the first visible light emitting element 111 is a luminous display screen such as a SUPER AMOLED screen, an AMOLED screen or a TFT-LCD screen. Alternatively, in some other embodiments, the first visible light emitting element 111 is a camera flashlight of the handheld device 11. Moreover, the camera flashlight is disposed on a backside of the handheld device 11. The camera flashlight is a light emitting diode or any other light emitting element.

In this embodiment, the digital stereo set 12 comprises a host 121, at least one sound box 122, and a first optical sensor 1211. The first optical sensor 1211 is disposed on the host 121. The first optical sensor 1211 is for example a photoresistor, a photodiode, a phototransistor, a two-dimensional optical sensor. In this embodiment, the digital stereo set 12 is a single-box stereo set where the host 121 and the sound box 122 are separate components. Alternatively, in some other embodiments, the host 121 and the sound box 122 are integrated into an integral stereo set.

In the audio playback system 1 of this embodiment, a visible light signal from the first visible light emitting element 111 of the handheld device 11 may be sensed by the first optical sensor 1211 of the digital stereo set 12. According to the visible light signal, a control message from the handheld device 11 is analyzed by the digital stereo set 12. Moreover, according to the control message, a control action is executed by the digital stereo set 12. The operations of the audio playback system 1 will be illustrated as follows.

Figure 2:
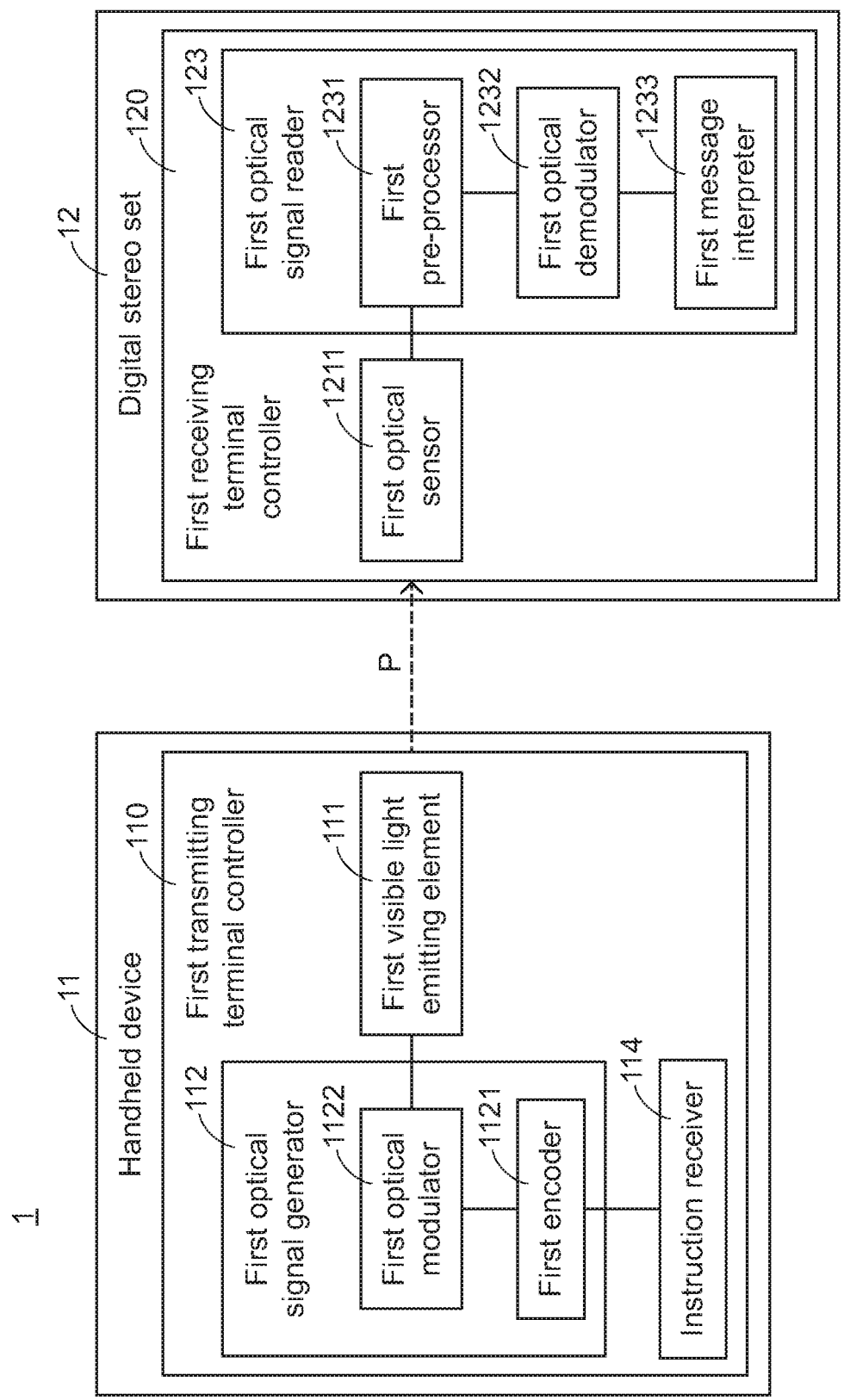
FIG. 2 is a schematic functional block illustrating the audio playback system according to the first embodiment of the present invention.
Figure 3:
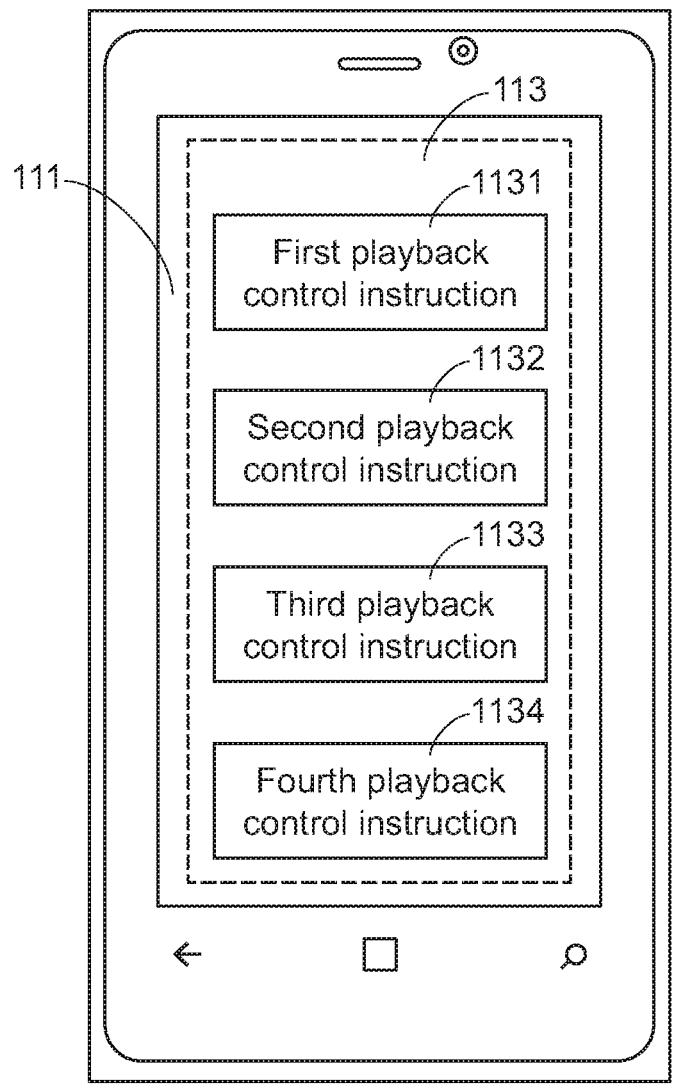
FIG. 3 schematically illustrates a user interface of the audio playback system according to the first embodiment of the present invention.
Figure 4:
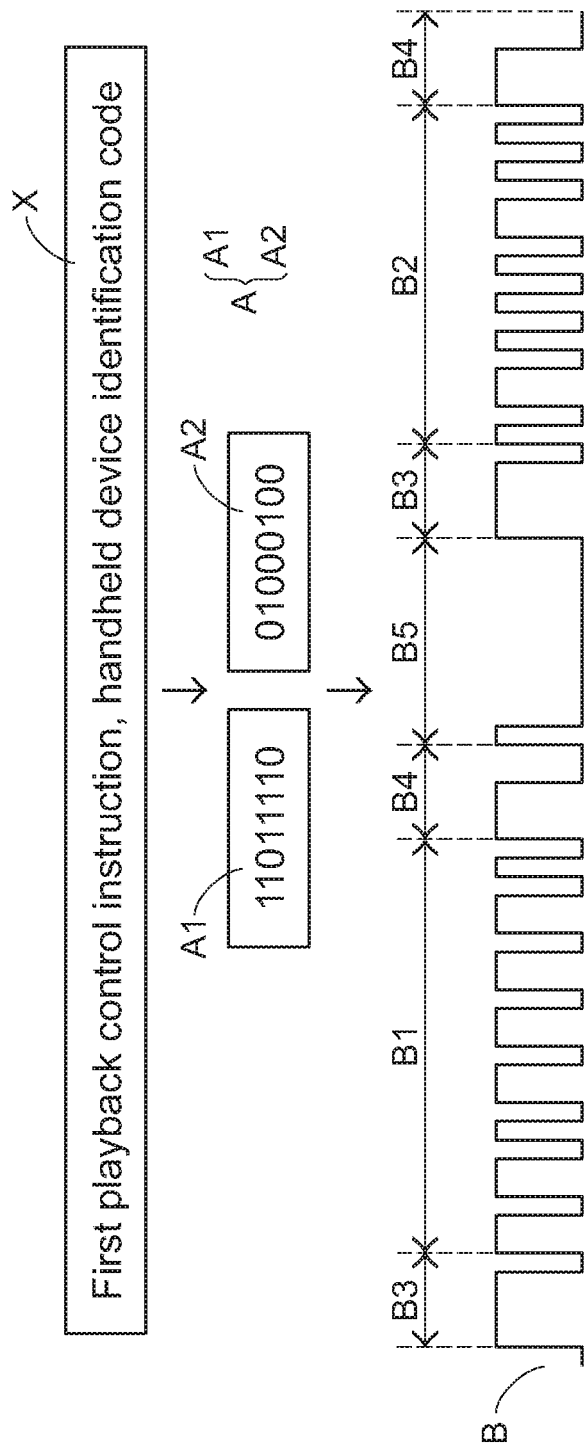
FIG. 4 schematically illustrates associated signals processed by the audio playback system according to the first embodiment of the present invention.

Hereinafter, the operations of the audio playback system 1 will be illustrated with reference to FIGS. 1-4. FIG. 2 is a schematic functional block illustrating the audio playback system according to the first embodiment of the present invention. FIG. 3 schematically illustrates a user interface of the audio playback system according to the first embodiment of the present invention. FIG. 4 schematically illustrates associated signals processed by the audio playback system according to the first embodiment of the present invention.

As shown in FIG. 2, the handheld device 11 comprises a first transmitting terminal controller 110 for converting the control message into the visible light signal. In this embodiment, the first transmitting terminal controller 110 comprises the first visible light emitting element 111, a first optical signal generator 112, and an instruction receiver 114. The first optical signal generator 112 comprises a first encoder 1121 and a first optical modulator 1122. The digital stereo set 12 comprises a first receiving terminal controller 120 for restoring the visible light signal to the control message. The first receiving terminal controller 120 comprises the first optical sensor 1211 and a first optical signal reader 123. The first optical signal reader 123 comprises a first pre-processor 1231, a first optical demodulator 1232, and a first message interpreter 1233.

When the user wants to use the handheld device 11 to control the digital stereo set 12, the user may firstly select and open an application program (APP) from the handheld device 11. The application program may be built-in the handheld device 11. Alternatively, the application program may be downloaded to the handheld device 11 by the user, and then installed in the handheld device 11.

After the application program is opened, a user interface (UI) 113 is shown on the display screen (i.e. the first visible light emitting element 111). As shown in FIG. 3, the user interface 113 comprises a first playback control instruction 1131, a second playback control instruction 1132, a third playback control instruction 1133, and a fourth playback control instruction 1134. In an embodiment, the first playback control instruction 1131 denotes "an instruction of starting playback from previous pause", the second playback control instruction 1132 denotes "an instruction of random playback", the third playback control instruction 1133 denotes "an instruction of playing a first playing file list", and the fourth playback control instruction 1134 denotes "an instruction of establishing a playing file list". It is noted that the above instructions are presented herein for purpose of illustration and description only. However, those skilled in the art will readily observe that numerous modifications and alterations of the type of the user interface 113 and the playback control instructions may be made according to the practical requirements.

Moreover, each playback control instruction has a corresponding binary instruction code. According to the previous settings, the binary instruction code can be identified and executed by the digital stereo set 12. For example, in this embodiment, a binary instruction code corresponding to the first playback control instruction 1131 is "11011110", a binary instruction code corresponding to the second playback control instruction 1132 is "01010010", a binary instruction code corresponding to the third playback control instruction 1133 is "11011101", and a binary instruction code corresponding to the fourth playback control instruction 1134 is "00001111". It is noted that the binary instruction codes corresponding to the respective playback control instructions are presented herein for purpose of illustration and description only.

Then, the user may select one or more binary instruction codes from the user interface 113. If the first playback control instruction 1131 (i.e. the instruction of starting playback from previous pause) is selected by the user and the first playback control instruction 1131 is confirmed to be executed, a binary instruction code A corresponding to a control message X which is generated upon confirmation of the selected first playback control instruction 1131 will be transmitted from the instruction receiver 114 to the first encoder 1121. At the same time, a prompt message is shown on the user interface 113 of the handheld device 11 to notify the user of allowing the display screen (i.e. the first visible light emitting element 111) to face and approach the first optical sensor 1211 of the digital stereo set 12 in order to send the control message X. After the digital stereo set 12 issues a response sound, it means that the control message X has been successfully transmitted to the digital stereo set 12. Under this circumstance, the handheld device 11 may be moved away by the user.

In some situations, one digital stereo set 12 may be controlled by plural handheld devices. For executing a control action corresponding to a specified handheld device (i.e. a personalized control action), the digital stereo set 12 should realize which handheld device sends the control message X. Consequently, in this embodiment, the control message X contains the first playback control instruction 1131 and a handheld device identification code of the handheld device 11. In other words, a binary instruction code A1 corresponding to the first playback control instruction 1131 is transmitted from the instruction receiver 114 to the first encoder 1121, and a binary instruction code A2 corresponding to the handheld device identification code of the handheld device 11 is also transmitted to the first encoder 1121.

In this embodiment, the handheld device identification code may be a code name that is set by the user (e.g. a code name "D"), but is not limited thereto. Alternatively, the handheld device identification code may be an IMEI code or a MAC address of the handheld device 11. In this embodiment, the binary instruction code A2 corresponding to the handheld device identification code of the handheld device 11 is "01000100".

Next, the binary instruction codes A1 and A2 are encoded by first encoder 1121, and thus a first pulse signal B is obtained. As shown in FIG. 4, the first pulse signal B comprises plural high voltage level signals with the same height but different widths. The height of each high voltage level signal indicates the voltage strength. The meaning of the high voltage level signals of the first pulse signal B will be illustrated as follows. As shown in FIG. 4, a 2 ms-width high voltage level signal and a successive 2 ms-width low voltage level signal are collectively defined as a binary code "0"; and a 4 ms-width high voltage level signal and a successive 2 ms-width low voltage level signal are collectively defined as a binary code "1". The width of the high voltage level signal denotes the duration of the high voltage level signal. Consequently, as shown in FIG. 4, the binary instruction code A2 corresponding to the handheld device identification code is converted into a handheld device identification signal B2 according to the above definitions, and the binary instruction code A1 corresponding to the first playback control instruction 1131 is converted into a playback control instruction signal B1 according to the above definitions.

Moreover, for clearly defining the ranges of the binary instruction codes A1 and A2, the first pulse signal B further comprises a start signal B3 prior to the playback control instruction signal B1 and another start signal B3 prior to the handheld device identification signal B2; and the first pulse signal B further comprises a termination signal B4 posterior to the playback control instruction signal B1 and another termination signal B4 posterior to the handheld device identification signal B2.

Moreover, in this embodiment, for clearly distinguishing the binary instruction codes A1 and A2 from each other, the first pulse signal B further comprises a spacing signal B5 between the playback control instruction signal B1 and the handheld device identification signal B2. In other words, the first pulse signal B of this embodiment is composed of the playback control instruction signal B1, the handheld device identification signal B2, the start signal B3, the termination signal B4 and the spacing signal B5.

In this embodiment, an 8 ms-width high voltage level signal and a successive 2 ms-width low voltage level signal are collectively defined as the start signal B3; a 6 ms-width high voltage level signal and a successive 4 ms-width low voltage level signal are collectively defined as the termination signal B4; and a 2 ms-width high voltage level signal and a successive 20 ms-width low voltage level signal are collectively defined as the spacing signal B5.

Then, the first pulse signal B is transmitted to the first optical modulator 1122. According to the first pulse signal B, the display screen (i.e. the first visible light emitting element 111) is controlled by the first optical modulator 1122. In response to the high voltage level signal, the display screen (i.e. the first visible light emitting element 111) emits a light beam. Whereas, in response to the low voltage level signal, the display screen (i.e. the first visible light emitting element 111) stops emitting the light beam. That is, according to the first pulse signal B, the on/off states of the display screen (i.e. the first visible light emitting element 111) are alternately switched at a specified frequency. Consequently, a first visible light signal P is generated.

Next, by sensing the changes of the on/off states of the display screen (i.e. the first visible light emitting element 111), the first visible light signal P is received by the first optical sensor 1211. In response to the first visible light signal P, the first optical sensor 1211 generates a corresponding first electric signal. In case that the photoresistor is used as the first optical sensor 1211, the resistance of the photoresistor increases when the light intensity gradually decreases, and the resistance of the photoresistor decreases when the light intensity gradually increases. According to the characteristics of the first optical sensor 1211, the first optical sensor 1211 generates the corresponding first electric signal.

Next, the first electric signal is transmitted to the first pre-processor 1231. In this embodiment, the first pre-processor 1231 is a filter or an amplifier. The filter is used for removing the undesired component of the first electric signal or strengthening the desired component of the first electric signal. The amplifier is used for amplifying the weak signal. Regardless of whether the first pre-processor 1231 is the filter or the amplifier, the purpose of the first pre-processor 1231 is to reduce interference such that the first electric signal is closer to the first pulse signal B.

After the first electric signal is adjusted by the first pre-processor 1231, the adjusted first electric signal is transmitted to the first optical demodulator 1232. By the first optical demodulator 1232, the first electric signal is restored to the undecoded first pulse signal B. In this embodiment, the first optical demodulator 1232 is a level comparator. Afterwards, the undecoded first pulse signal B is transmitted to the first message interpreter 1233. By the first message interpreter 1233, the first pulse signal B is restored to the binary instruction code A2 corresponding to the handheld device identification code and the binary instruction code A1 corresponding to the first playback control instruction 1131 according to the above encoding rule of the first encoder 1121, and the control message X is obtained according to the binary instruction codes A1 and A2.

According to the control message X, the digital stereo set 12 recognizes that the handheld device 11 requests to start playback from previous pause. Since the usage history of each device is recorded in the digital stereo set 12, the digital stereo set 12 may search the playback history of the handheld device 11 from its database and start playback from previous pause of the handheld device 11.

On the other hand, if the second playback control instruction 1132 (i.e. the instruction of random playback) and the third playback control instruction 1133 (i.e. the instruction of playing the first playing file list) are selected from the user interface 113 by the user, after the binary instruction code A2 corresponding to the handheld device identification code, a binary instruction code corresponding to the second playback control instruction 1132 and a binary instruction code corresponding to the third playback control instruction 1133 are received by the digital stereo set 12, the first playing file list corresponding to the handheld device 11 is selected from the database and the audio files of the first playing file list are randomly played.

On the other hand, if only the second playback control instruction 1132 (i.e. the instruction of random playback) is selected from the user interface 113 by the user, only the binary instruction code corresponding to the second playback control instruction 1132 is transmitted from the handheld device 11 to the digital stereo set 12. In other words, it is not necessary to transmit the handheld device identification code of the handheld device 11, but the audio files in the database can be randomly played by the digital stereo set 12.

On the other hand, if the fourth playback control instruction 1134 (i.e. the instruction of establishing a playing file list) is selected from the user interface 113 by the user, it is necessary for the user to previously set the contents of the playing file list through the user interface 113 of the handheld device 11. After the binary instruction code A2 corresponding to the handheld device identification code, a binary instruction code corresponding to the fourth playback control instruction 1134 and a binary instruction code corresponding to the playing file list are received by the digital stereo set 12, the playing file list corresponding to the handheld device 11 is established in the database of the digital stereo set 12.

From the above discussions about the audio playback system 1, the first visible light signal P from the first visible light emitting element 111 is used to transmit the control message X in order to control the digital stereo set 12 to execute the corresponding control action. Moreover, in the audio playback system 1 of this embodiment, the control message X may be transmitted to the digital stereo set 12 according to the on/off states of the display screen. Since it is not necessary to transmit the control message X by the wireless communication technology, the drawbacks encountered from the above-mentioned radio frequency communication technology will be solved. Moreover, the purpose of executing the personalized control action is achievable by transmitting the handheld device identification code.

By the way, the handheld device 11 of the present invention may transmit other control messages to the digital stereo set 12. According to other control messages from the handheld device 11, the digital stereo set 12 may execute other control actions (e.g. play, pause, previous, next, fast forward, fast reverse, and the like).

Figure 5:
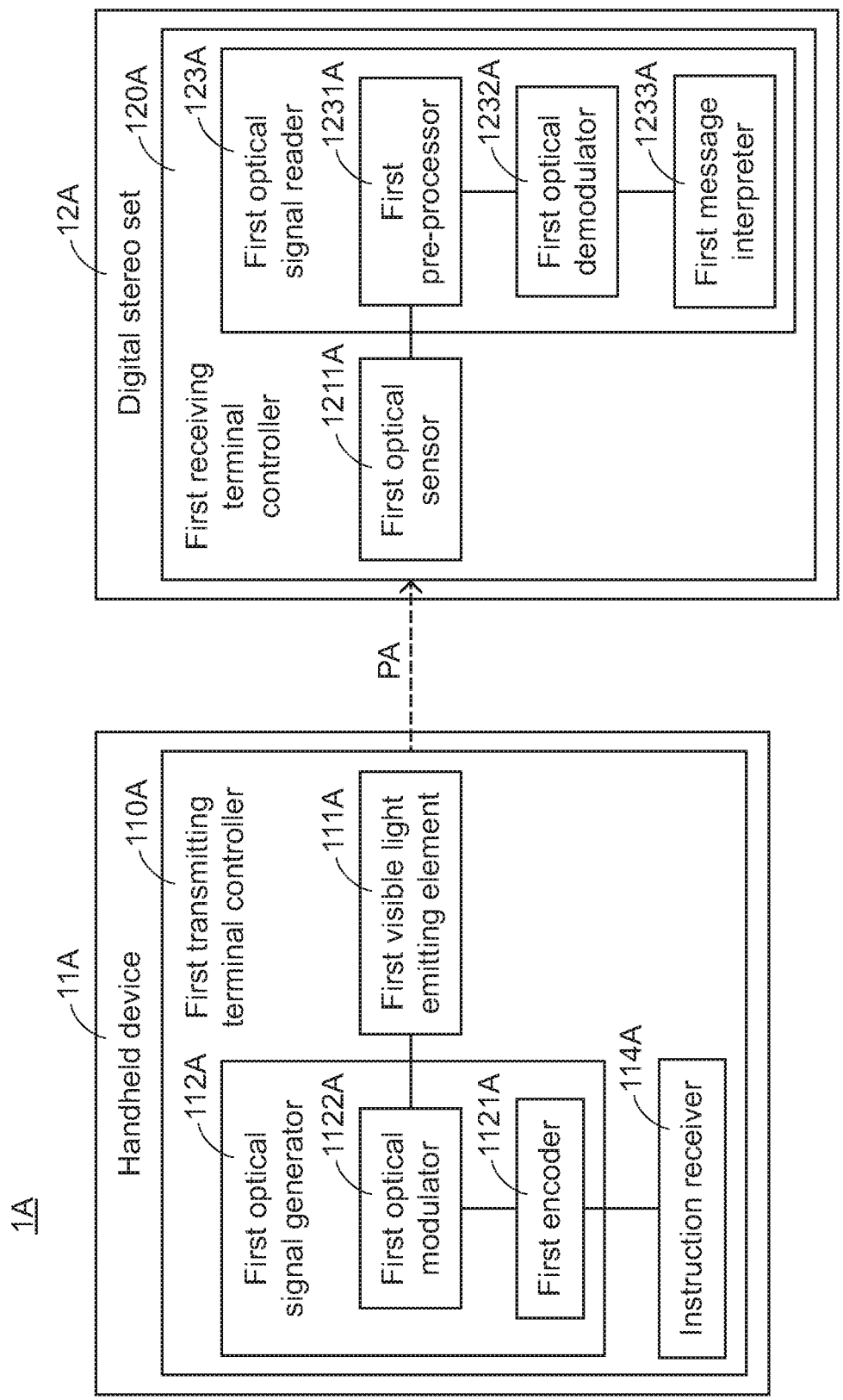
FIG. 5 is a schematic functional block illustrating an audio playback system according to a second embodiment of the present invention.

Hereinafter, an audio playback system according to a second embodiment of the present invention will be illustrated with reference to FIGS. 5 and 6. FIG. 5 is a schematic functional block illustrating an audio playback system according to a second embodiment of the present invention. FIG. 6 schematically illustrates an encoding rule for the audio playback system according to the second embodiment of the present invention.

In this embodiment, the audio playback system 1A comprises a handheld device 11A and a digital stereo set 12A. The handheld device 11A comprises a first transmitting terminal controller 110A for converting a control message into a visible light signal. The first transmitting terminal controller 110A comprises a first visible light emitting element 111A, a first optical signal generator 112A, and an instruction receiver 114A. The first optical signal generator 112A comprises a first encoder 1121A and a first optical modulator 1122A. In this embodiment, the first visible light emitting element 111A is a luminous display screen.

The digital stereo set 12A comprises a first receiving terminal controller 120A for restoring the visible light signal to the control message. The first receiving terminal controller 120A comprises a first optical sensor 1211A and a first optical signal reader 123A. The first optical signal reader 123A comprises a first pre-processor 1231A, a first optical demodulator 1232A, and a first message interpreter 1233A.

In comparison with the first embodiment, the binary instruction code corresponding to the control message is converted into different color lights by the first encoder 1121A. Consequently, in this embodiment, the first visible light emitting element 111A emits different color lights within a specified time interval in order to transmit the control message.

The encoding rule of converting the control message into different color lights by the first encoder 1121A will be illustrated in FIG. 6. For example, according to previous settings, the binary code corresponding to the blue light is "001", the binary code corresponding to the green light is "010", the binary code corresponding to the red light is "100", the binary code corresponding to the cyan light is "011", the binary code corresponding to the yellow light is "110", the binary code corresponding to the magenta light is "101", and the binary code corresponding to the white light is "111".

In case that the binary instruction code corresponding to the control message is "010100101", the control message is converted into a combination of a green light, a red light and a magenta light by the first encoder 1121A. Consequently, the first visible light emitting element 111A sequentially emits the green light, the red light and the magenta light in order to generate a first visible light signal PA.

In this embodiment, the first optical sensor 1211A is an optical sensor that senses three primary color lights (e.g. red, green and blue lights). After the green light, the red light and the magenta light are sequentially sensed and received by the first optical sensor 1211A, the first visible light signal PA is restored to the control message by the first optical signal reader 123A.

Figure 7:
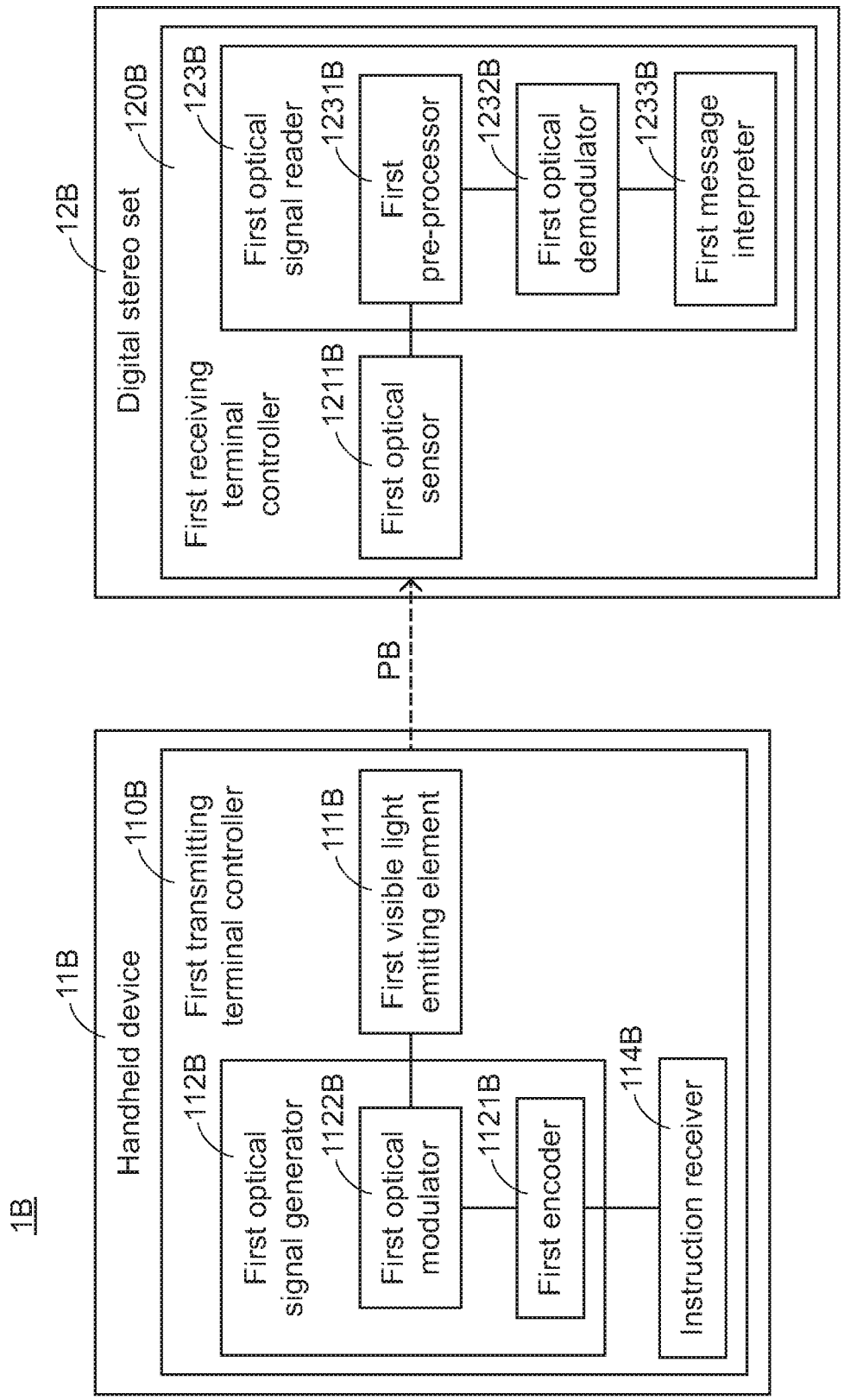
FIG. 7 is a schematic functional block illustrating an audio playback system according to a third embodiment of the present invention.
Figures 8, 9:
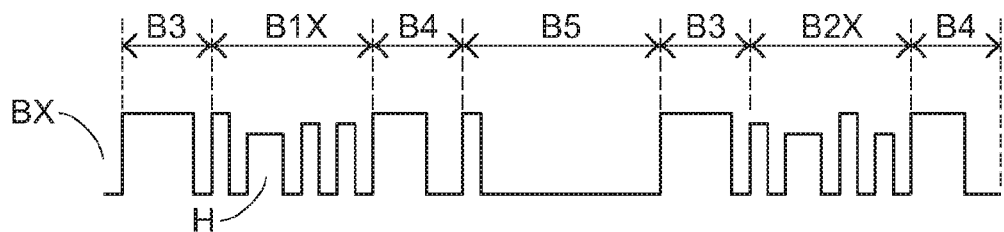
FIG. 8 schematically illustrates associated signals processed by the audio playback system according to the third embodiment of the present invention.
FIG. 9 schematically illustrates an encoding rule for the audio playback system according to the third embodiment of the present invention.

Hereinafter, an audio playback system according to a third embodiment of the present invention will be illustrated with reference to FIGS. 7, 8 and 9. FIG. 7 is a schematic functional block illustrating an audio playback system according to a third embodiment of the present invention. FIG. 8 schematically illustrates associated signals processed by the audio playback system according to the third embodiment of the present invention. FIG. 9 schematically illustrates an encoding rule for the audio playback system according to the third embodiment of the present invention.

In this embodiment, the audio playback system 1B comprises a handheld device 11B and a digital stereo set 12B. The handheld device 11B comprises a first transmitting terminal controller 110B for converting a control message into a visible light signal. The first transmitting terminal controller 110B comprises a first visible light emitting element 111B, a first optical signal generator 112B, and an instruction receiver 114B. The first optical signal generator 112B comprises a first encoder 1121B and a first optical modulator 1122B. In this embodiment, the first visible light emitting element 111B is a luminous display screen.

The digital stereo set 12B comprises a first receiving terminal controller 120B for restoring the visible light signal to the control message. The first receiving terminal controller 120B comprises a first optical sensor 1211B and a first optical signal reader 123B. The first optical signal reader 123B comprises a first pre-processor 1231B, a first optical demodulator 1232B, and a first message interpreter 1233B.

Similarly, in this embodiment, the on/off states of the display screen (i.e. the first visible light emitting element 111B) are alternately switched at a specified frequency in order to generate a first visible light signal PB. In comparison with the first embodiment, the binary instruction code corresponding to the control message of this embodiment is converted into a first pulse signal BX by the first encoder 1121B. As shown in FIG. 8, the first pulse signal BX comprises plural high voltage level signals H with different heights and different widths. Moreover, according to the first pulse signal BX, the on/off states of the first visible light emitting element 111B are correspondingly controlled, so that a first visible light signal PB is generated. The height of each high voltage level signal indicates the voltage strength. The width of the high voltage level signal denotes the duration of the high voltage level signal.

The encoding rule of converting the control message into the first pulse signal BX comprising plural high voltage level signals H with different heights and different widths by the first encoder 1121B will be illustrated in FIG. 9. For example, in this embodiment, each high voltage level signal may indicate four bits d3, d2, d1 and d0, wherein d0 is the lowest bit, d1 is the second lowest bit, d2 is the second highest bit, and d3 is the highest bit. For example, if the high voltage level signal indicates four bits "0101", the bit d3 is 0, the bit d2 is 1, the bit d1 is 0, and the bit d0 is 1. The bits d2, d1 and d0 are determined according to the height of the high voltage level signal (i.e. the voltage strength). In addition, the bit d3 is determined according to the width of the high voltage level signal. In this embodiment, the binary code corresponding to the highest bit d3 of the 2 ms-width high voltage level signal is "0", and the binary code corresponding to the highest bit d3 of the 4 ms-width high voltage level signal is "1".

Moreover, the voltage strength V of a full range voltage is previously divided into eight equal parts. The eight equal parts are determined according to the zero-grade voltage strength V0 to the seventh-grade voltage strength V7 and the full range voltage. Each of the voltage strengths from the zero-grade voltage strength V0 to the seventh-grade voltage strength V7 corresponds to a voltage level signal (see FIG. 9). In this embodiment, the high voltage level signal with an height between the zero-grade voltage strength V0 and the first-grade voltage strength V1 has a corresponding binary code "000", the high voltage level signal with an height between the first-grade voltage strength V1 and the second-grade voltage strength V2 has a corresponding binary code "001", the high voltage level signal with an height between the second-grade voltage strength V2 and the third-grade voltage strength V3 has a corresponding binary code "010", the high voltage level signal with an height between the third-grade voltage strength V3 and the fourth-grade voltage strength V4 has a corresponding binary code "011", the high voltage level signal with an height between the fourth-grade voltage strength V4 and the fifth-grade voltage strength V5 has a corresponding binary code "100", the high voltage level signal with an height between the fifth-grade voltage strength V5 and the sixth-grade voltage strength V6 has a corresponding binary code "101", the high voltage level signal with an height between the sixth-grade voltage strength V6 and the seventh-grade voltage strength V7 has a corresponding binary code "110", and the high voltage level signal with an height between the seventh-grade voltage strength V7 and the full range voltage has a corresponding binary code "111".

In this embodiment, the full range voltage is determined according to the voltage strength of the start signal B3 (see FIG. 8). In case that the signal is subject to change by various factors, the high voltage level signal of the start signal B3 may be used as a basis of compensating the difference.

Please refer to FIGS. 8 and 9. In this embodiment, the binary instruction code corresponding to the playback control instruction of the control message is "0111110101100110", and the binary instruction code corresponding to the handheld device identification code of the control message is "0110110101110101".

Firstly, the binary instruction code corresponding to the playback control instruction is converted into a playback control instruction signal B1X by the first encoder 1121B. According to the encoding rule of FIG. 9, the playback control instruction signal B1X is composed of a 2 ms-width high voltage level signal with an height between the seventh-grade voltage strength V7 and the full range voltage, a 4 ms-width high voltage level signal with an height between the fifth-grade voltage strength V5 and the sixth-grade voltage strength V6, a 2 ms-width high voltage level signal with an height between the sixth-grade voltage strength V6 and the seventh-grade voltage strength V7, and a 2 ms-width high voltage level signal with an height between the sixth-grade voltage strength V6 and the seventh-grade voltage strength V7 (see FIG. 8).

Next, the binary instruction code corresponding to the handheld device identification code is converted into a handheld device identification signal B2X by the first encoder 1121B. According to the encoding rule of FIG. 9, the handheld device identification signal B2X is composed of a 2 ms-width high voltage level signal with an height between the sixth-grade voltage strength V6 and the seventh-grade voltage strength V7, a 4 ms-width high voltage level signal with an height between the fifth-grade voltage strength V5 and the sixth-grade voltage strength V6, a 2 ms-width high voltage level signal with an height between the seventh-grade voltage strength V7 and the full range voltage, and a 2 ms-width high voltage level signal with an height between the fifth-grade voltage strength V5 and the sixth-grade voltage strength V6.

Like the first embodiment, the first pulse signal BX further comprises a start signal B3 prior to the playback control instruction signal B1X and another start signal B3 prior to the handheld device identification signal B2X. Like the first embodiment, the first pulse signal BX further comprises a termination signal B4 posterior to the playback control instruction signal B1X and another termination signal B4 posterior to the handheld device identification signal B2X. Moreover, the first pulse signal BX further comprises a spacing signal B5 between the playback control instruction signal B1X and the handheld device identification signal B2X. In other words, the first pulse signal BX of this embodiment is composed of the playback control instruction signal B1X, the handheld device identification signal B2X, the start signal B3, the termination signal B4 and the spacing signal B5.

According to the first pulse signal BX, the on/off states of the first visible light emitting element 111B are controlled by the first optical modulator 1122B. Consequently, a first visible light signal PB is generated. By the way, as the voltage strength increases, the light intensity of the first visible light emitting element 111B increases, and vice versa.

After the first visible light signal PB is sensed and received by the first optical sensor 1211B, the first visible light signal PB is restored to the control message by the first optical signal reader 123B.

From the above discussions, the encoding methods of the first embodiment, the second embodiment and the third embodiment of the present invention can provide different data transmission speeds. In accordance with the encoding method of the third embodiment, each high voltage level signal indicates four bits. In accordance with the encoding method of the first embodiment, each high voltage level signal indicates one bit. In comparison with the encoding method of the first embodiment, the encoding method of the third embodiment can increase the transmission speed of the control instruction by near eight times. It is noted that the above three encoding methods are presented herein for purpose of illustration and description only. However, those skilled in the art will readily observe that numerous modifications and alterations of the encoding method of the audio playback system may be made according to the practical requirements.

Moreover, a checksum mechanism or a cyclic redundancy check (CRC) mechanism may be used in the audio playback system of the present invention in order to assure that the first playback control instruction and the handheld device identification code restored by the first optical signal reader are correct. The operating principles of the checksum mechanism and the cyclic redundancy check (CRC) mechanism are well known to those skilled in the art, and are not redundantly described herein.

Figure 10:
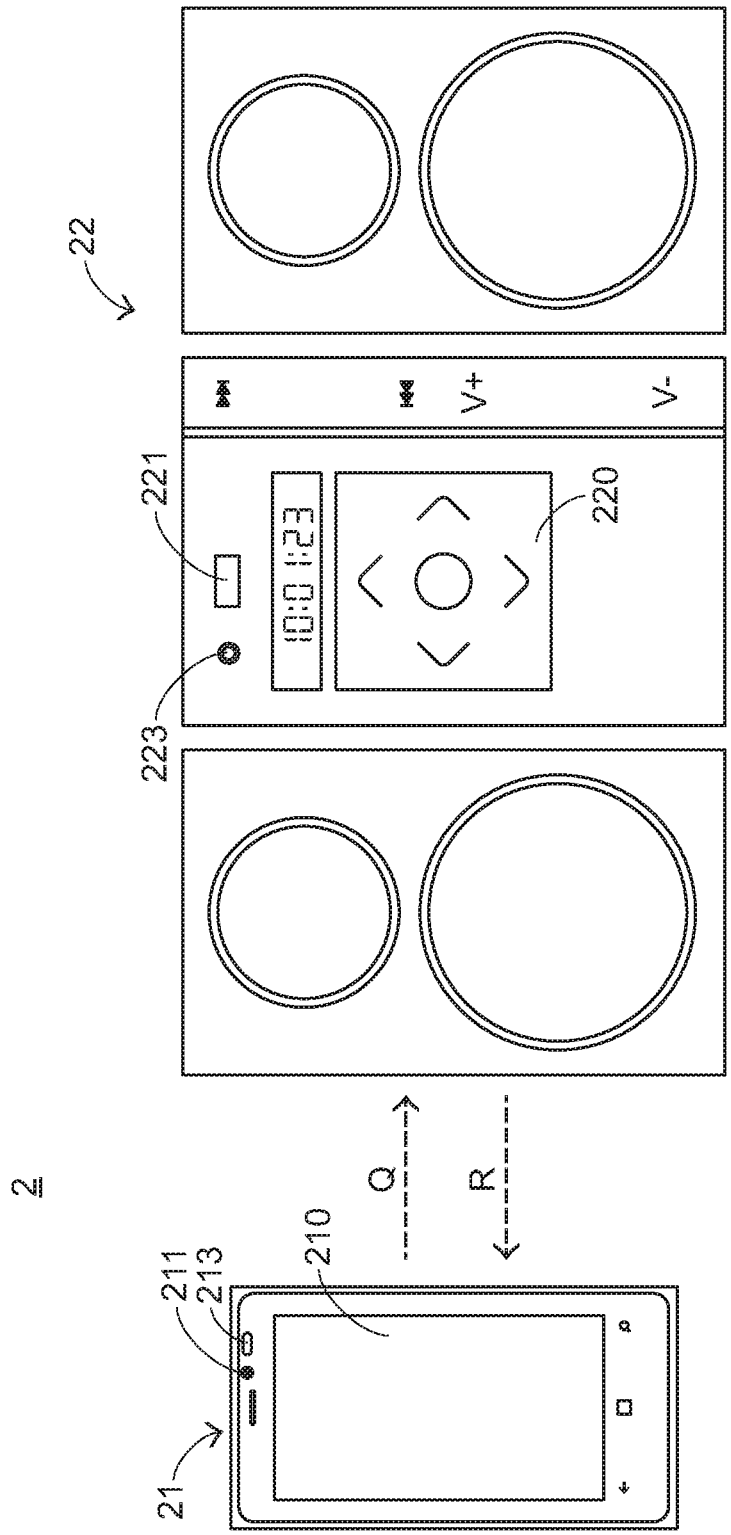
FIG. 10 schematically illustrates the architecture of an audio playback system according to a fourth embodiment of the present invention.
Figure 11:
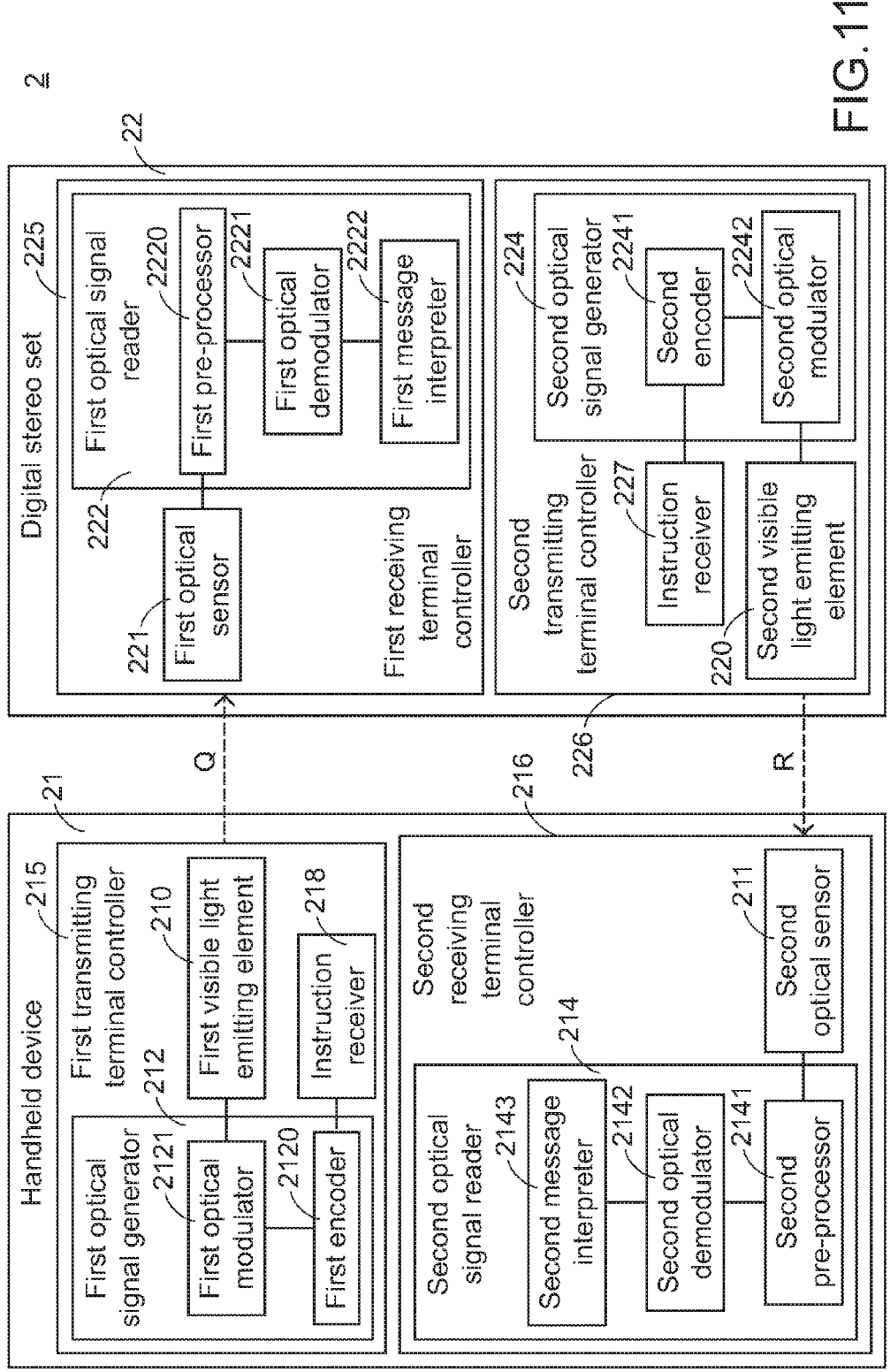
FIG. 11 is a schematic functional block illustrating the audio playback system according to the fourth embodiment of the present invention.

Hereinafter, an audio playback system according to a fourth embodiment of the present invention will be illustrated with reference to FIGS. 10 and 11. FIG. 10 schematically illustrates the architecture of an audio playback system according to a fourth embodiment of the present invention. FIG. 11 is a schematic functional block illustrating the audio playback system according to the fourth embodiment of the present invention.

As shown in FIGS. 10 and 11, the audio playback system 2 comprises a handheld device 21 and a digital stereo set 22. In this embodiment, the handheld device 21 comprises a first transmitting terminal controller 215 and a second receiving terminal controller 216. The first transmitting terminal controller 215 comprises a first visible light emitting element 210, a first optical signal generator 212, and an instruction receiver 218. The second receiving terminal controller 216 comprises a second optical sensor 211 and a second optical signal reader 214.

The digital stereo set 22 comprises a first receiving terminal controller 225 and a second transmitting terminal controller 226. The first receiving terminal controller 225 comprises a first optical sensor 221 and a first optical signal reader 222. The second transmitting terminal controller 226 comprises a second visible light emitting element 220, a second optical signal generator 224, and an instruction receiver 227.

The first optical signal generator 212 comprises a first encoder 2120 and a first optical modulator 2121. The second optical signal reader 214 comprises a second pre-processor 2141, a second optical demodulator 2142, and a second message interpreter 2143. The first optical signal reader 222 comprises a first pre-processor 2220, a first optical demodulator 2221, and a first message interpreter 2222. The second optical signal generator 224 comprises a second encoder 2241 and a second optical modulator 2242.

In this embodiment, the first visible light emitting element 210 is a display screen, and the second visible light emitting element 220 is a control panel. Moreover, the second optical sensor 211 is a two-dimensional optical sensor of a camera module.

An example of the two-dimensional optical sensor of the camera module includes but is not limited to a charge-coupled device (CCD) or a complementary metal-oxide semiconductor (CMOS).

It is noted that the second optical sensor of the handheld device 21 is not restricted to the two-dimensional optical sensor of the camera module. For example, in some other embodiments, the second optical sensor of the handheld device 21 is an ambient light sensor. The ambient light sensor is used to detect the ambient brightness. Consequently, the light intensity of the display screen (i.e. the first visible light emitting element 210) of the handheld device 21 may be correspondingly adjusted according to the ambient brightness.

It is noted that the second visible light emitting element of the digital stereo set 22 is not restricted to the control panel. For example, in some other embodiments, an indicating lamp 223 is used as the second visible light emitting element of the digital stereo set 22. An example of the indicating lamp 223 is a light emitting diode.

The audio playback system 2 of this embodiment has the control functions of the audio playback system 1 of the first embodiment. Furthermore, the pairing relation between the handheld device 21 and the digital stereo set 22 can be established by the first visible light emitting element 210, the first optical signal generator 212, the second optical sensor 211 and the second optical signal reader 214 of the handheld device 21 and the first optical sensor 221, the first optical signal reader 222, the second visible light emitting element 220 and the second optical signal generator 224 of the digital stereo set 22. After the pairing relation is established, data can be exchanged between the handheld device 21 and the digital stereo set 22. A process of establishing the pairing relation will be illustrated in more details as follows.

Figure 12:
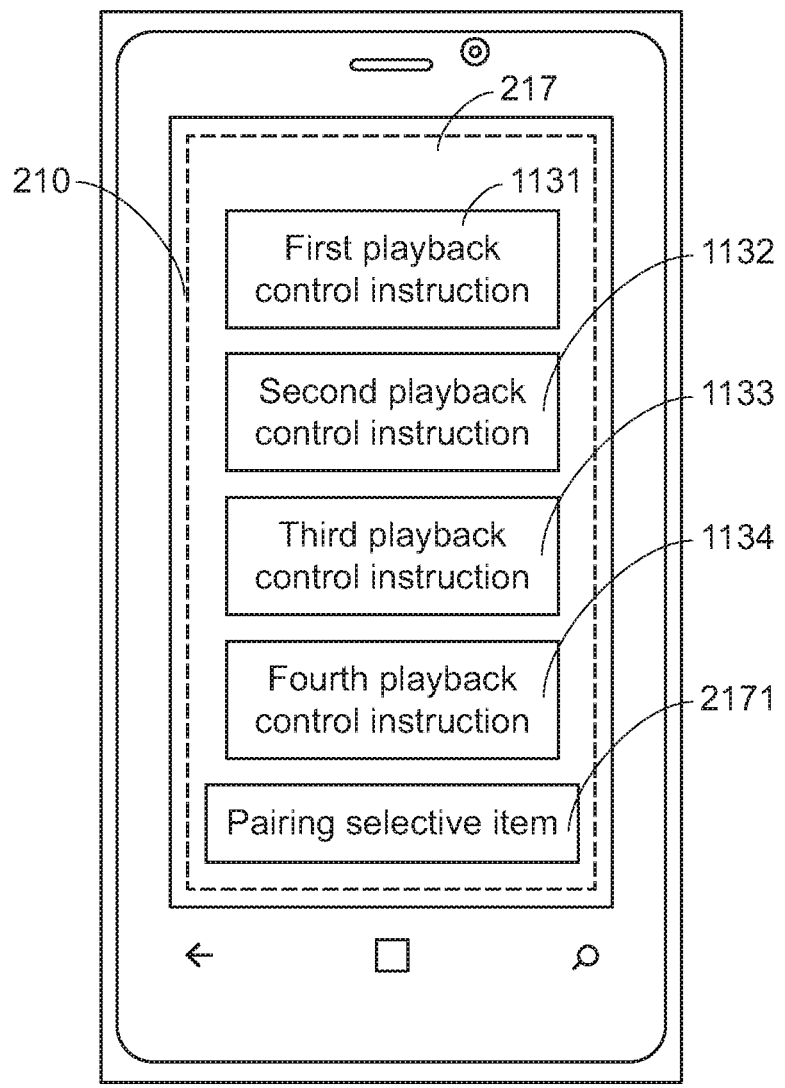
FIG. 12 schematically illustrates a user interface of the audio playback system according to the fourth embodiment of the present invention.

Please refer to FIGS. 10-12. FIG. 12 schematically illustrates a user interface of the audio playback system according to the fourth embodiment of the present invention. For pairing the handheld device 21 with the digital stereo set 22, the user may firstly select and open an application program (APP) from the handheld device 21. The application program may be built-in the handheld device 21. Alternatively, the application program may be downloaded to the handheld device 21 by the user, and then installed in the handheld device 21.

After the application program is opened, a user interface 217 is shown on the display screen (i.e. the first visible light emitting element 210). The user interface 217 at least comprises a pairing selective item 2171. After the pairing selective item 2171 is selected by the user, the handheld device 21 may prompt the user to have the display screen (i.e. the first visible light emitting element 210) approach the first optical sensor 221 of the digital stereo set 22.

Moreover, after the pairing selective item 2171 is selected, a control message is correspondingly generated. The control message is transmitted from the instruction receiver 218 to the first optical signal generator 212. By the first optical signal generator 212, the control command is converted into a first pulse signal, and the first pulse signal is then converted into a first visible light signal Q. In this embodiment, the control message is a paring instruction. The first pulse signal comprises the start signal B3, the termination signal B4, and a pairing instruction signal which is obtained by encoding a binary instruction code corresponding to the pairing instruction. Moreover, the process of converting the control message into the first visible light signal Q by the first optical signal generator 212 is similar to the process of converting the control message X into the first visible light signal P by the first optical signal generator 112 of the first embodiment, and is not redundantly described herein.

After the first visible light signal Q is received by the first optical sensor 221 of the digital stereo set 22, the first visible light signal Q is restored to the control message by the first optical signal reader 222. The process of restoring the first visible light signal Q to the control message by the first optical sensor 221 is similar to the process of restoring the first visible light signal P to the control message X by the first optical sensor 123, and is not redundantly described herein.

Next, according to the control message (i.e. the pairing instruction), the instruction receiver 227 of the digital stereo set 22 sends a stereo device identification code to the second encoder 2241 and the second optical modulator 2242. Consequently, the stereo device identification code is converted into a second pulse signal. According to the second pulse signal, the second visible light emitting element 220 is controlled. That is, the on/off states of the second visible light emitting element 220 are alternately switched at a specified frequency, and thus a second visible light signal R is generated. In this embodiment, the stereo device identification code is a built-in paring password (e.g. 8888, 0000 or 1111) of the digital stereo set 22 for pairing. The second pulse signal comprises the start signal B3, the termination signal B4, and a pairing instruction signal which is obtained by encoding the binary instruction code corresponding to the stereo device identification code.

The operations of the second encoder 2241 and the second optical modulator 2242 are similar to the operations of the first encoder 1121 and the first optical modulator 1122 of the first embodiment, and are not redundantly described herein.

Moreover, by sensing the on/off states of the second visible light emitting element 220, the second visible light signal R is received by the second visible light emitting element 220. In response to the second visible light signal R, the second visible light emitting element 220 generates a corresponding second electric signal. After the second electric signal is adjusted by the second pre-processor 2141 of the second optical signal reader 214, the interference of the second electric signal is reduced. Then, the second electric signal is restored to the second pulse signal by the second optical demodulator 2142. Afterwards, the second pulse signal is restored to the stereo device identification code by the second message interpreter 2143. In this embodiment, the second pre-processor 2141 is a filter or an amplifier, and the second optical demodulator 2142 is a level comparator.

The operations of the second pre-processor 2141, the second optical demodulator 2142 and the second message interpreter 2143 are similar to the operations of the first pre-processor 1231, the first optical demodulator 1232 and the first message interpreter 1233 of the first embodiment, and are not redundantly described herein.

After the stereo device identification code is acquired by the handheld device 21, a user code of the digital stereo set 22 may be shown on the user interface 217, which is displayed on the display screen (i.e. the first visible light emitting element 210). After the user code of the digital stereo set 22 is selected by the user, the paring process is completed by the handheld device 21. From now on, data can be transmitted between the handheld device 21 and the digital stereo set 22.

From the above descriptions about the audio playback system of the present invention, the visible light emitting element and the optical sensor are used to achieve the purpose of transmitting the control message between the handheld device and the digital stereo set. Moreover, the purpose of executing the personalized control action is achievable by transmitting the handheld device identification code. Consequently, the audio playback system of the present invention is capable of eliminating the drawbacks of the above-mentioned wireless communication technology. Moreover, the audio playback system of the present invention can make good use of the basic components of the handheld device in order to expand and change the applications of the handheld device. Consequently, the handheld device can quickly and conveniently control the corresponding control action of the digital stereo set, especially the personalized control action. Moreover, the audio playback system of the present invention can establish the pairing relation between the handheld device and the digital stereo set through visible light communication. In comparison with the wireless communication technology, the pairing process used in the audio playback system of the present invention is simplified and has less possibility of causing erroneous pairing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An audio playback system, comprising:
a handheld device comprising a first transmitting terminal controller, wherein the first transmitting terminal controller comprises:
a first visible light emitting element; and
a first optical signal generator for converting a control message into a first pulse signal, and controlling on/off states of the first visible light emitting element according to the first pulse signal, thereby generating a first visible light signal, wherein the first optical signal generator comprises:
a first encoder for converting the control message into the first pulse signal; and
a first optical modulator for controlling the on/off states of the first visible light emitting element according to the first pulse signal; and
a digital stereo set comprising a host and a sound box for playing a digital audio file, wherein the digital stereo set further comprises a first receiving terminal controller, and the first receiving terminal controller comprises:
a first optical sensor for sensing the on/off states of the first visible light emitting element, thereby receiving the first visible light signal; and
a first optical signal reader for restoring the first visible light signal to the control message, wherein the first optical signal reader comprises:
a first pre-processor for adjusting a first electric signal to reduce interference, wherein the first electric signal is generated when the on/off states of the first visible light emitting element is sensed by the first optical sensor;
a first optical demodulator for restoring the first electric signal to the first pulse signal; and
a first message interpreter for restoring the first pulse signal to the control message,
wherein after the control message is received by the digital stereo set, the digital stereo set performs a corresponding control action according to the control message.

2. The audio playback system according to claim 1, wherein the first pre-processor is a filter or an amplifier, and the first optical demodulator is a level comparator.

3. The audio playback system according to claim 1, wherein the first pulse signal comprises plural high voltage level signals with the same voltage strength but different widths.

4. The audio playback system according to claim 1, wherein the first pulse signal comprises plural high voltage level signals with different voltage strengths and different widths, wherein each of the plural high voltage level signals indicates four bits.

5. The audio playback system according to claim 4, wherein a full range voltage of the plural high voltage level signals is determined according to a voltage strength of a start signal.

6. The audio playback system according to claim 1, wherein the handheld device further comprises a display screen for providing a user interface, wherein via the user interface, the control message is selectively transmitted by a user.

7. The audio playback system according to claim 1, wherein the first visible light emitting element of the handheld device is a display screen or a flashlight.

8. The audio playback system according to claim 1, wherein the handheld device is a smart phone or a tablet personal computer.

9. The audio playback system according to claim 1, wherein the control message contains at least one playback control instruction, or the control message contains at least one playback control instruction and a handheld device identification code.

10. The audio playback system according to claim 1, wherein the control message is a pairing instruction.

11. The audio playback system according to claim 1, wherein every three bits of the control message is converted into a corresponding color light.

12. An audio playback comprising:
a handheld device comprising a first transmitting terminal controller, wherein the first transmitting terminal controller comprises:
a first visible light emitting element; and
a first optical signal generator for converting a control message into a first pulse signal, and controlling on/off states of the first visible light emitting element according to the first pulse signal, thereby generating a first visible light signal, wherein the control message is a pairing instruction;
a digital stereo set comprising a host and a sound box for playing a digital audio file, wherein the digital stereo set further comprises:
a first receiving terminal controller, and the first receiving terminal controller comprises:
a first optical sensor for sensing the on/off states of the first visible light emitting element, thereby receiving the first visible light signal; and
a first optical signal reader for restoring the first visible light signal to the control message,
wherein after the control message is received by the digital stereo set, the digital stereo set performs a corresponding control action according to the control message, wherein the digital stereo set further comprises a second transmitting terminal controller, and the handheld device further comprises a second receiving terminal controller,
wherein the second transmitting terminal controller comprises a second visible light emitting element and a second optical signal generator, wherein the second optical signal generator is configured for converting a stereo device identification code of the digital stereo set into a second pulse signal, and controlling on/off states of the second visible light emitting element according to the second pulse signal, thereby controlling the second visible light emitting element to generate a second visible light signal,
wherein the second receiving terminal controller comprises a second optical sensor for sensing the on/off states of the second visible light emitting element to receive the second visible light signal, and a second optical signal reader for restoring the second visible light signal to the stereo device identification code,
wherein after the control message is received by the digital stereo set, the stereo device identification code is converted into the second visible light signal by the second transmitting terminal controller.

13. The audio playback system according to claim 12, wherein the second optical signal generator of the digital stereo set comprises:
a second encoder for converting the stereo device identification code into the second pulse signal; and
a second optical modulator for controlling the on/off states of the second visible light emitting element according to the second pulse signal.

14. The audio playback system according to claim 13, wherein the second optical signal reader of the handheld device comprises:
a second pre-processor for adjusting a second electric signal to reduce interference, wherein the second electric signal is generated when the on/off states of the second visible light emitting element is sensed by the second optical sensor;
a second optical demodulator for restoring the second electric signal to the second pulse signal; and
a second message interpreter for restoring the second pulse signal to the stereo device identification code.

15. The audio playback system according to claim 12, wherein the second visible light emitting element of the digital stereo set is a control panel or an indicating lamp.

16. The audio playback system according to claim 12, wherein the second optical sensor of the handheld device is a camera module optical sensor or an ambient light sensor.

17. The audio playback system according to claim 12, wherein the handheld device further comprises a display screen for providing a user interface, wherein via the user interface, a user is permitted to selectively activate a pairing process.

18. An audio playback system, comprising:
a handheld device comprising a first transmitting terminal controller, wherein the first transmitting terminal controller comprises:
a first visible light emitting element; and
a first optical signal generator for converting a control message into at least one color light, and controlling the first visible light emitting element to emit the at least one color light, thereby generating a first visible light signal; and
a digital stereo set comprising a host and a sound box for playing a digital audio file, wherein the digital stereo set further comprises a first receiving terminal controller, and the first receiving terminal controller comprises:
a first optical sensor for sensing the at least one color light, thereby receiving the first visible light signal; and a first optical signal reader for restoring the first visible light signal to the control message, wherein the first optical signal reader comprises:
    a first pre-processor for adjusting a first electric signal to reduce interference, wherein the first electric signal is generated when the at least one color light is sensed by the first optical sensor;
    a first optical demodulator for restoring the first electric signal to the at least one color light; and
    a first message interpreter for restoring the at least one color light to the control message,
wherein after the control message is received by the digital stereo set, the digital stereo set performs a corresponding control action according to the control message.

19. The audio playback system according to claim 18, wherein the first optical signal generator comprises:
    a first encoder for converting the control message into the at least one color light; and
    a first optical modulator for controlling the first visible light emitting element to emit the at least one color light.

20. The audio playback system according to claim 18, wherein the first pre-processor is a filter or an amplifier, and the first optical demodulator is a level comparator.

21. The audio playback system according to claim 18, wherein the control message contains at least one playback control instruction, or the control message contains at least one playback control instruction and a handheld device identification code.

22. An audio playback system, comprising:
    a handheld device comprising a first transmitting terminal controller, wherein the first transmitting terminal controller comprises:
        a first visible light emitting element; and
        a first optical signal generator for converting a control message into a first pulse signal, and controlling on/off states of the first visible light emitting element according to the first pulse signal, thereby generating a first visible light signal; and
    a digital stereo set comprising a host and a sound box for playing a digital audio file, wherein the digital stereo set further comprises a first receiving terminal controller, and the first receiving terminal controller comprises:
        a first optical sensor for sensing the on/off states of the first visible light emitting element, thereby receiving the first visible light signal; and
        a first optical signal reader for restoring the first visible light signal to the control message,
wherein after the control message is received by the digital stereo set, the digital stereo set performs a corresponding control action according to the control message, wherein the first pulse signal comprises plural high voltage level signals with the same voltage strength but different widths.

23. The audio playback system according to claim 22, wherein each of the plural high voltage level signals indicates four bits.

24. The audio playback system according to claim 23, wherein a full range voltage of the plural high voltage level signals is determined according to a voltage strength of a start signal.

25. An audio playback system, comprising:
    a handheld device comprising a first transmitting terminal controller, wherein the first transmitting terminal controller comprises:
        a first visible light emitting element; and
        a first optical signal generator for converting a control message into a first pulse signal, and controlling on/off states of the first visible light emitting element according to the first pulse signal, thereby generating a first visible light signal; and
    a digital stereo set comprising a host and a sound box for playing a digital audio file, wherein the digital stereo set further comprises a first receiving terminal controller, and the first receiving terminal controller comprises:
        a first optical sensor for sensing the on/off states of the first visible light emitting element, thereby receiving the first visible light signal; and
        a first optical signal reader for restoring the first visible light signal to the control message,
wherein after the control message is received by the digital stereo set, the digital stereo set performs a corresponding control action according to the control message, wherein every three bits of the control message is converted into a corresponding color light.

* * * * *